(12) United States Patent
Osorio Murillo et al.

(10) Patent No.: US 10,961,406 B2
(45) Date of Patent: Mar. 30, 2021

(54) SMEAR RESISTANT INK COMPOSITION

(71) Applicant: SUN CHEMICAL CORPORATION, Parsippany, NJ (US)

(72) Inventors: Jarol Alberto Osorio Murillo, Fort Mill, SC (US); Kyle Hill, Rock Hill, SC (US); Kaci Allen, Charlotte, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 16/967,592

(22) PCT Filed: Feb. 12, 2019

(86) PCT No.: PCT/US2019/017587
§ 371 (c)(1),
(2) Date: Aug. 5, 2020

(87) PCT Pub. No.: WO2019/157482
PCT Pub. Date: Aug. 15, 2019

(65) Prior Publication Data
US 2021/0017409 A1 Jan. 21, 2021

Related U.S. Application Data

(60) Provisional application No. 62/629,344, filed on Feb. 12, 2018.

(51) Int. Cl.
*C09D 11/037* (2014.01)
*C09J 7/29* (2018.01)
*B65D 65/42* (2006.01)
*C09D 11/102* (2014.01)

(52) U.S. Cl.
CPC ............ *C09D 11/037* (2013.01); *B65D 65/42* (2013.01); *C09D 11/102* (2013.01); *C09J 7/29* (2018.01); *C09J 2467/006* (2013.01); *C09J 2475/00* (2013.01)

(58) Field of Classification Search
CPC .... B65D 65/42; C09D 11/037; C09D 11/102; C09J 7/29
See application file for complete search history.

(56) References Cited

U.S. PATENT DOCUMENTS

| 7,153,576 B2 | 12/2006 | Wang et al. |
| 8,361,217 B2 | 1/2013 | Voit et al. |
| 2011/0025038 A1 | 2/2011 | Lawrence |
| 2013/0235114 A1 | 9/2013 | Van Thillo et al. |
| 2016/0264797 A1 | 9/2016 | Goustiaux et al. |
| 2017/0342288 A1 | 11/2017 | Kitade et al. |
| 2019/0092953 A1 | 3/2019 | Kagata et al. |

FOREIGN PATENT DOCUMENTS

WO   WO 98/13430 A1   4/1998

OTHER PUBLICATIONS

PCT International Search Report issued in PCT/US2019/017587 dated Apr. 26, 2019.
Written Opinion of the International Searching Authority issued in PCT/US2019/017587 dated Apr. 26, 2019.
International Preliminary Report on Patentability (Chapter 1 of the Patent Cooperation Treaty) issued in International Application No. PCT/US2019/017587, dated Jul. 29, 2020.

*Primary Examiner* — Edward J Cain
(74) *Attorney, Agent, or Firm* — Marian E. Fundytus; Ostrolenk Faber LLP

(57) ABSTRACT

Described herein is an ink composition resistant to smearing, particularly when used in combination with adhesives, such as those containing polyols, including polyurethane adhesives. The present ink system is heat resistant, that is, it can withstand elevated temperatures, such as baking and cooking temperatures, and thus is suited for printing on food packaging in which the food contents are cooked in the packaging. The composition includes one or more of an elastomeric polyurethane resin, a styrene maleic anhydride copolymer, a polyurethane-polyol resin, and a group IV metal chelating agent.

23 Claims, No Drawings

SMEAR RESISTANT INK COMPOSITION

CROSS REFERENCE TO RELATED APPLICATIONS

The present application is a § 371 National Phase application based on PCT/US19/17587 filed Feb. 12, 2019, which claims the benefit of U.S. Provisional Application No. 62/629,344, filed Feb. 12, 2018 the subject matter of each of which is incorporated by reference in their entirety.

FIELD OF THE INVENTION

The present application is directed to inks coatings, and laminate combinations including inks and coatings that provide effective resistance to smearing.

BACKGROUND OF THE INVENTION

Smears caused by limitations of inks and adhesives are prevalent in the packaging industry. Such smears can occur during lamination. Smears may be particularly prevalent in urethane-based inks and adhesives systems. Smearing may be caused by mechanical force, chemical interaction, or a combination thereof.

Inks and coatings may be applied to packaging as a laminate system of layers. For example, upward from the substrate, the applied layers may be ink, adhesive and sealant. What might be problematic is the application of the adhesive layer over the ink, which in the case of polyurethanes and other kinds of adhesives, may contain polyol components. Migration of the adhesive into the ink layer, and in particular migration of the polyol component may cause the ink to smear. While not wishing to be bound by any theory, it may be that the migrated adhesive resolubilizes resins in the ink, rendering the ink more susceptible to smearing due to chemical or mechanical interactions, as often occurs when freshly laminated rolls contact other surfaces or objects. The polyol components of such adhesives may be a cause of this undesirable resolublizing effect.

A prior art laminate structure exhibits the technical problem to be solved by the present invention. The laminate structure includes layers of sealant (sometimes called "secondary film"), adhesive, and ink on a substrate. Migration of the adhesive that is applied over ink migrates into ink layer during the lamination process, which can cause the resolubilization of ink materials, leading to smearing.

Flexible packaging materials are used to package a wide variety of materials including consumer goods and many different kinds of food items. A flexible packaging may be a constructed laminate of different film layers in which inks are printed onto a primary film, then coated with a layer of laminating adhesive and adhered to a secondary film to form a laminated structure.

Flexible packaging structures have been traditionally made with solvent-borne laminating adhesives. Lower cost, more environmentally friendly two-component solvent-less adhesives have been commercialized to replace solvent-borne adhesives. However, solvent-less laminating adhesives often require storage for a prolonged period (e.g., up to 14 days) before developing bond strength sufficient to permit handling and further processing, as well as to be considered safe for packaging of foods. In recent years, various efforts have been made to decrease the rate of cure for solvent-less laminating adhesives. This has led to the development of low molecular weight polyol components that exhibit a higher degree of molecular mobility, allowing for the aforedescribed interactions with the printed ink that cause the ink to smear or streak. Smeared or streaked ink is undesirable in appearance and may be perceived as a lack of care or quality.

The problem may be particularly acute when the adhesive is a 100% solids polyurethane based adhesive. Such adhesives cure at ambient temperature, and during this time they interact with the ink resins. In particular, polyol components of the adhesive interact with the resins.

Accordingly, there is a need for an ink composition that can be used in combinations with adhesives, such as in laminate systems, in which the ink is resistant to smearing.

SUMMARY OF THE INVENTION

The present invention is an ink composition suitable for use on flexible packaging that is resistant to smearing, particularly when used in combination with adhesives; such as those containing polyols, such as polyurethane adhesives. Also, the present ink system is heat resistant, that is, it is printable on packaging and other materials that are exposed to elevated temperatures, such as cooking temperatures of about 180° F. to 190° F.

The ink compositions include one or more of an organic solvent or solvents; elastomeric polyurethane resin, a styrene maleic anhydride copolymer, a polyurethane-polyol resin, and a group IV metal chelating agent.

In one aspect, the present ink composition includes one or more of:
 a) A organic solvent, or a combination of two or more organic solvents;
 b) A non-reactive elastomeric polyurethane resin, such as a semi-aliphatic elastomeric polyurethane resin;
 c) A styrene maleic anhydride copolymer;
 d) A polyurethane polyol resin, such as a polyurethane polyol resin in solution;
 e) An adhesion promoter (e.g., a group IV metal titanium chelate such as a titanium chelate); and
 f) A pigment.

In one aspect, the non-reactive elastomeric polyurethane resin is a semi-aliphatic elastomeric polyurethane resin.

In one aspect, the polyurethane polyol resin is a polyurethane polyol resin in solution.

In one aspect, the adhesion promoter is a titanium chelate.

In one aspect, the pigment added to the ink composition is added as dispersion in a resin binder.

In one aspect, invention described herein is a varnish that includes the organic solvent; the non-reactive elastomeric polyurethane resin, such as a semi-aliphatic elastomeric polyurethane resin; the styrene maleic anhydride copolymer; the polyurethane polyol resin solution; and the adhesion promoter (e.g., a titanium chelate). The pigment and/or pigment dispersion is later added to the varnish to form the ink formulations described herein.

DETAILED DESCRIPTION

In one aspect, the smear resistant solvent-based ink includes an elastomeric polyurethane resin, a styrene maleic anhydride copolymer, a polyurethane polyol resin, a pigment, and a group IV metal chelating agent adhesion promoter.

In one aspect, the elastomeric polyurethane resin is a semi-aliphatic high molecular weight elastomeric polyurethane resin.

In one aspect, the elastomeric polyurethane resin is non-reactive.

In one aspect, the elastomeric polyurethane resin is tin-free.

In one aspect, the elastomeric polyurethane resin has a Tg of 60° C.

In one aspect, the elastomeric polyurethane resin is a tin-free semi-aliphatic high molecular weight elastomeric polyurethane.

In one aspect, the elastomeric polyurethane resin is a tin-free semi-aliphatic high molecular weight elastomeric polyurethane having a molecular weight of 90,000 to 120,000 (wt avg.)

In one aspect, the pigment is present as a pigment component comprised of pigment and resin binder.

In one aspect, the resin binder is a polymer resin selected from nitrocellulose-based resins, polyester-based resins, polyurethane-based resins, polyvinyl butyral-based resins, styrene modified resins, and mixtures thereof.

In one aspect, invention described herein is a varnish that includes the organic solvent; the non-reactive elastomeric polyurethane resin, such as a semi-aliphatic elastomeric polyurethane resin; the styrene maleic anhydride copolymer; the polyurethane polyol resin solution; and the adhesion promoter (e.g., a titanium chelate). The pigment and/or pigment dispersion is later added to the varnish to form the ink formulations described herein.

In one aspect, the styrene maleic anhydride copolymer is a partial mono-ester of styrene maleic anhydride and a mixture of cyclohexanol and isopropyl alcohol and having a molecular weight around 7000, a Tg of 125° C. and acid equivalent value of 270 mgKOH/g.

In one aspect, the polyurethane-polyol resin has a Tg of 100° C. to 160° C. and equivalent hydroxyl value of 170 mg KOH/g to 200 mg KOH/g.

In one aspect, the pigment dispersion of the ink includes an organic solvent selected from aliphatic alcohols and esters.

In another inventive aspect, the invention is a printed article comprising a substrate printed with the ink composition described herein.

In one aspect, the substrate of the printed article is comprised of a material selected from polyester, e.g., polyethylene terephthalate, nylon, and polypropylene, such as biaxially oriented polypropylene (BOPP). Substrate films often used for food packaging include, in addition to BOPP, BO-PET (Bi-Oriented Polyester Terephthalate), and OPA (Oriented Polyamide or Nylon).

In one aspect, the printing of the ink occurs by flexographic printing and rotogravure printing.

In one aspect, the printed article includes an adhesive layer printed over the ink composition described herein, wherein the ink composition is resistant to smearing that may be caused by the adhesive, in particular an adhesive that includes polyols, such as a polyurethane adhesive.

In another inventive aspect, the invention is flexible packaging comprising flexible packaging substrate printed with the ink composition described herein.

In one aspect, the flexible packaging substrate is comprised of a material selected from polyester, e.g., polyethylene terephthalate, nylon, and polypropylene, such as biaxially oriented polypropylene (BOPP). Substrate films often used for flexible food packaging include, in addition to BOPP, BO-PET (Bi-Oriented Polyester Terephthalate), and OPA (Oriented Polyamide or Nylon).

In one aspect, the flexible packaging includes an adhesive layer printed over the ink composition described herein, wherein the ink composition is resistant to smearing that may be caused by an adhesive, in particular an adhesive that includes polyols, such as a polyurethane adhesive.

In another inventive aspect, the invention is a method of improving smear resistance in a printed article comprising printing the ink composition of claim 1 onto a substrate, wherein the ink resists smearing caused by an adhesive layer printed over the ink. The adhesive may be a polyol-containing adhesive, such as a polyurethane adhesive, and/or a 100% solids polyurethane adhesive.

Solvent

Any suitable organic solvent may be used in the ink formulation. Exemplary solvents include, but are not limited to, ethyl alcohol, diacetone alcohol, N-propyl acetate, N-propyl alcohol, isopropyl alcohol, n-butanol, ethyl acetate, isopropyl acetate, N-butyl acetate, methoxy propyl acetate, dipropylene glycol methyl ether, methoxy propanol acetate (also known as propylene glycol monomethyl ether acetate), dipropylene glycol methyl ether, and mixtures thereof.

In one aspect, ethyl alcohol and n-propyl acetate are a preferred solvent combination, as they lead to rapid ink drying in a desired amount of time.

The amount of solvent in the ink formulation may be 5.0 wt % to 40 wt %, preferably 5.0 wt % to 30 wt %, more preferably 10 wt % to 20 wt %.

Elastomeric Polyurethane Resin

The elastomeric polyurethane resin solution aids in holding the laminated structure together and provides chemical resistance, such as to a polyol component of an adhesive. In one aspect, the non-reactive elastomeric polyurethane resin solution includes a semi-aliphatic polyurethane, that is, one that includes aromatic groups. One suitable elastomeric polyurethane resin solution is available in solution as TP-633, available from Morchem. This resin has been found to have good compatibility with pigment dispersions. Another suitable resin is an amino functional aliphatic elastomeric polyurethane.

In one aspect, the elastomeric polyurethane resin is a semi-aliphatic high molecular weight elastomeric polyurethane, e.g., a molecular weight of 90,000 to 120,000 (wt. avg.)

In one aspect, the elastomeric polyurethane resin is non-reactive.

In one aspect, the elastomeric polyurethane resin is tin-free. By being tin-free, the elastomeric polyurethane resin solution complies with regulations governing food packaging. Thus, a tin-free elastomeric polyurethane is preferred. TP-633 is believed to be tin-free.

In one aspect, the elastomeric polyurethane resin has a Tg of 60° C. A resin having this Tg is capable of resisting mechanical stress and wear and tear and still sufficiently flexible to yield strong bonds with the adhesive and the film.

In one aspect, the elastomeric polyurethane resin is a tin-free semi-aliphatic high molecular weight elakomeric polyurethane.

The amount of elastomeric polyurethane resin in the ink formulation may be 5.0 wt % to 40 wt %, preferably 5 wt % to 30 wt %, more preferably 7.5 wt % to 30 wt %.

Styrene Maleic Anhydride Copolymer

The styrene maleic anhydride co-polymer provides chemical resistance and mechanical resistance to the polyol component of the adhesives, such as polyurethane adhesives.

In one aspect, the styrene maleic anhydride copolymer is a partial mono-ester of styrene maleic anhydride and a mixture of cyclohexanol and isopropyl alcohol and having a molecular weight of or around 7000, a Tg of 125° C. and acid equivalent value of 270 mgKOH/g.

Other styrene based compounds with similar Tgs, acid values, and molecular weights may also be used in place of, or in combination with, the styrene-malic anhydride copolymer.

A suitable styrene-maleic anhydride copolymer is one available from Cray Valley under the SMA® 17352 designation. This copolymer has an acid number of 270 mgKOH/g, a Tg of 125° C., Mn of 2800, and Mw of 7000.

Similar co-polymers may also be used, that is co-polymers having another acid anhydride component or an aromatic ethylenically unsaturated monomers, in order to provide resistance to the polyol component of the urethane adhesive.

The amount of styrene-maleic anhydride copolymer in the ink formulation may be 0.5 wt % to 10 wt %, preferably 1.0 wt % to 8.0 wt %, more preferably 1.0 wt % to 5.0 wt %.

Polyurethane Polyol Resin

The polyurethane polyol resin contributes to the adhesion of the ink to the substrate. In one aspect, the polyurethane-polyol resin has a Tg of 100° C. to 160° C. and equivalent hydroxyl value of 170 mg KOH/g to 200 mg KOH/g. One suitable polyurethane polyol resin is available as polyurethane polyol resin in solution under the trade name TEGO® VariPlus 1201 TF, available from Evonik Industries (solvent: ethyl acetate). This resin has a Tg of 130° C. and a hydroxy value of 200 mgKOH/g. The polyurethane polyol resin solution further provides hardness, gloss, and blocking resistance, as well as enhancing color.

The amount of polyurethane polyol resin solution in the ink formulation may be 0.5 wt % to 10 wt %, preferably 1.0 wt % to 8.0 wt %, more preferably 2.5 wt % to 6.0 wt %. Ordinarily, about 40-50 wt % of the solution is the polyurethane polyol resin solids.

Adhesion Promoter

The group IV metal chelating agent adhesion promoter that provides chemical resistance to polyol containing adhesives such as polyurethane adhesives. The adhesion promoter may be a group IV metal chelating agent, such as a titanium or zirconium chelating agent. Suitable chelating agents include: titanium orthoesters, such as Tyzor® IAM—a titanium-based phosphate complex; tetraalkyl titanates represented by the general structure $Ti(OR)_4$, where R is $C_3$ to $C_8$ alkyl.

Examples include: TYZOR® TPT—tetraisopropyl titanate $(Ti(OC_3H_7)_4)$; TYZOR® TnBT—tetra-n-butyl titanate $(Ti(OC_4H_9)_4)$; and TYZOR® TOT-tetrakis(2-ethylhexyl)titanate $(Ti(OCH_2CHC_4H_9)C_2H_5)$.

Examples other examples of organic titanates and zirconates are listed in Table 1 below:

TABLE 1

| Chemical Name | CAS No. |
| --- | --- |
| Tetra n-Butyl Titanate | 5593-70-4 |
| Tetra Isopropyl Titanate | 546-68-9 |
| Tetra 2-Ethylhexyl Titanate | 1070-10-6 |
| Poly Butyl Titanate | 162303-51-7 |
| Isopropyl Butyl Titanate | 68955-22-6 |
| Tetra n-Propyl Titanate | 3087-37-4 |
| Tetra Ethyl Titanate | 3087-36-3 |
| Tetra t-Butyl Titanate | 3087-39-6 |
| Tetra n-Propyl Zirconate | 23519-77-9 |
| Tetra n-Butyl Zirconate | 1071-76-7 |

Further examples are listed in Table 2 below:

TABLE 2

| Chemical Name | CAS No. |
| --- | --- |
| titanium diisopropoxide bis(acetylacetonate), | 17927-72-9 |
| butyl titanium phosphate | 109037-78-7 |
| triethanolamine titanate | 36673-16-2 |
| di-iso-propoxy titanium his ethyl acetoacetate | 27858-32-8 |
| alkonolamine titanate complex (titanium, diethylene glycol ethylene glycol triisopropanolamine complex, per CAS description) | 68784-47-4 |
| alkonolamine titanate complex (titanium, diethylene glycol propylene glycol triethanolamine complex, per CAS description) | 68784-48-5 |
| alkonolamine titanate complex (titanium, (s)-lactate polyethylene glycol triisopropanolamine ammonium complex, per CAS description) | 1072830-14-8 |
| titanium ammonium lactate | 65104-06-5 |
| ammonium zirconium lactate acetate | 68909-34-2 |
| triethanolamine zirconate | 101033-44-7 |
| di-iso-hutoxy titanium bis ethyl acetoacetate | 83877-9 1-2 |

One or more Group IV metal chelating agents may be used in the inks.

The amount of adhesion promoter in the ink formulation may be 0.1 wt % to 5.0 wt %, preferably 0.25 wt % to 5.0 wt %, more preferably 0.25 wt % to 1.0 wt %.

Pigments and Pigment Dispersions, and Other Colorants

Pigments are preferred as the colorant to be used in formulating the described ink compositions, though other colorants such as dyes may be employed. Suitable colorants include, but are not limited, to organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The colorant employed in the present invention may be any FD&C or D&C pigment. Preferred FD&C pigments include FD&C Red No. 40, FD&C Yellow No. 5, FD&C Yellow No. 6 and FD&C Blue No. 1. Preferred D&C pigments include D&C Red No. 6, D&C Red No. 7, D&C Red No. 21, D&C Red No. 22, D&C Red No. 27, Red No. 28, D&C Red No. 30, D&C Red No. 33, D&C Red No. 34, D&C Red No. 36, D&C Orange No. 5 and D&C Yellow No. 10.

The pigment may be present in a dispersion, that is, a pigment dispersed in a resin binder and one or more solvents. The resin binder may be a polymer resin selected from nitrocellulose-based resins, polyester-based resins, polyurethane-based resins, polyvinyl butyral-based resins, styrene modified resins, and mixtures thereof. Such resin binders are available under the trade names Neorez, Versamid, Morchem, Laroflex, Degalan, Mowital, and Neocryl.

The amount of pigment in the ink formulation may be 0.1 wt % to 20.0 wt %, preferably 0.25 wt % to 15.0 wt %, more preferably 8.0% to 15 wt %.

Other Additives

As with most ink compositions, additives may be incorporated to enhance various properties. A partial list of such additives includes but is not limited to adhesion promoters, silicones, light stabilizers, de-gassing additives, ammonia, flow promoters, defoamers, antioxidants, stabilizers, surfactants, dispersants, plasticizers, rheological additives, waxes, silicones, etc.

Ink compositions may be prepared in two part formulations in which a first part is varnish and a second part is a pigment dispersion. The varnish may contain the elastomeric polyurethane resin, the styrene maleic anhydride copolymer, the polyurethane polyol resin, and a group IV metal chelating agent adhesion promoter. The pigment may be added to the varnish in order to form the ink formulation.

The inks described herein can be printed by just about all known printing methods, such as flexo, gravure, lithography, screen printing, digital printing, among others. The inks are particularly well suited for flexographic printing and gravure printing.

The inks may be printed on all kinds of flexible packaging substrate materials, such as for example, Polyesters (PET) (e.g., corona treated, chemically treated, AlOx coated. They may also be printed on, for example nylon and polypropylene, such as biaxially oriented polypropylene.

After printing the substrate, lamination may occur in-line or off-line. In the in-line process the printing and lamination occur on the same step. In the off-line process the lamination occurs in a separate step from the printing step. The adhesive and the secondary film (i.e., sealant layer) are introduced during lamination. The adhesive bonds the films together to form one final structure, and the secondary film provides a heat seal that forms the final package (bag, pouch, label, etc.).

The present ink formulations and varnishes are suited for packaging that is exposed to high temperatures, such a packing that contains food heated or cooked in an oven. In addition to the smear resistant properties discussed herein, the inks and varnishes can withstand high heating temperatures, e.g., 180° F. to 195° F. for up to 4 hours.

The presently described inks and varnishes are well suited for use printing packaging used to package pre-cooked meats and other foods requiring heat through. The printed flexible laminate packaging structures should comply with standard requirements of laminated packaging (i.e. 160 gF/in peel strength), and to survive the cook-in or boil-in bag process the packaged food stuff will be subjected to, typically hot water at 95° C. for up to 4 hours at atmospheric pressure, without loss of peel strength.

The inventive inks and varnishes address both challenges. They are resistant to adhesive smear and survive the cook-in process.

EXAMPLES

Example 1—Smear Resistant Varnish Formulation

The varnishes and inks of the examples were prepared by mixing the listed components together at room temperature in a blade mixer.

TABLE 3

Example 1

| Material Description | wt % |
|---|---|
| Ethyl alcohol | 36 |
| Normal propyl acetate | 8.5 |
| Non-Reactive Elastomeric Polyurethane resin (in solution) (TP-633) | 35.0 |
| Styrene Maleic Anhydride copolymer (SMA ® 17352) | 5.0 |
| Polyurethane Polyol resin solution (TEGO ® VariPlus 1201 TF-45 wt % resin solids) | 13.3 |
| Titanium chelate adhesion promoter | 2.2 |
| Total | 100.0 |

Example 2—Smear Resistant Ink Formulation

Example 2 is an ink including the Example 1 varnish and a pigment dispersion in resin binder:

TABLE 4

| EXAMPLE 2 | |
|---|---|
| Material Description | wt % |
| Example 1 Varnish | 40 |
| Pigment dispersion in Resin Binder | 60 |
| Total | 100 |

The pigment dispersion is mixed in a blade mixer. The amount of varnish may be 20 wt % to 50 wt %. The amount of pigment dispersion may be 10 wt % to 80 wt %.

Example 3—Smear Resistant Varnish Formulation

TABLE 5

Example 3

| Material Description | wt % |
|---|---|
| Ethyl Alcohol | 2.0 |
| Diacetone Alcohol | 9.3 |
| Normal Propyl Acetate | 7.3 |
| Dipropylene Glycol Methyl Ether | 11.5 |
| Methoxy Propanol Acetate | 18.6 |
| Semi-Aliphatic Elastomeric Polyurethane resin Solution | 32.4 |
| Styrene Maleic Anhydride copolymer | 4.6 |
| Polyurethane Polyol resin solution | 12.3 |
| Titanium chelate adhesion promoter | 2.0 |
| Total | 100 |

The Non-Reactive Elastomeric Polyurethane resin, the Styrene Maleic Anhydride copolymer, the Polyurethane Polyol resin solution are the commercial products used in Example 1.

Example 4—Smear Resistant Yellow Ink

TABLE 6

| Example 4 | |
|---|---|
| Material Description | wt % |
| Varnish Components: | |
| Ethyl Alcohol | 4.8 |
| Diacetone Alcohol | 3.1 |
| Normal Propyl Acetate | 5.9 |
| Dipropylene Glycol Methyl Ether | 3.8 |
| Propylene Glycol Monomethyl Ether Acetate | 6.2 |
| Semi-Aliphatic Elastomeric Polyurethane resin Solution | 10.7 |
| Styrene Maleic Anhydride copolymer | 1.5 |
| Polyurethane Polyol resin solution | 4.1 |
| Titanium chelate adhesion promoter | 0.7 |
| Pigment Dispersion Components | |
| Propylene Glycol n-Propyl Ether | 15.4 |
| Propylene Glycol Monoethyl Ether | 12.9 |
| Nitrocellulose Resin | 6.3 |
| Yellow Pigment Color Index 14 | 10.9 |
| Normal Propyl Alcohol | 13.8 |
| Total | 100.0 |

The Non-Reactive Elastomeric Polyurethane resin, the Styrene Maleic Anhydride copolymer, the Polyurethane Polyol resin solution are the commercial products used in Example 1.

Example 5—Smear Resistant Black Ink

TABLE 7

| Example 5 | |
|---|---|
| Material Description | wt % |
| Varnish Components | |
| Ethyl Alcohol | 0.5 |
| Diacetone Alcohol | 2.4 |
| Normal Propyl Acetate | 5.1 |
| Dipropylene Glycol Methyl Ether | 2.9 |
| Propylene Glycol Monomethyl Ether Acetate | 4.8 |
| Semi-Aliphatic Elastomeric Polyurethane Resin Solution | 8.3 |
| Styrene Maleic Anhydride copolymer | 1.2 |
| Polyurethane Polyol resin solution | 3.1 |
| Titanium chelate adhesion promoter | 0.5 |
| Pigment Dispersion Components | |
| Propylene Glycol n-Propyl Ether | 38.0 |
| Nitrocellulose Resin | 6.3 |
| Carbon Black Pigment Color Index 7 | 15.0 |
| Pigment Dispersant Additive | 0.5 |
| Normal Propyl Alcohol | 11.4 |
| Total | 100.0 |

The Non-Reactive Elastomeric Polyurethane resin, the Styrene Maleic Anhydride copolymer, the Polyurethane Polyol resin solution are the commercial products used in Example 1.

Example 6—Smear Resistant Cyan Ink

TABLE 8

| Example 6 | |
|---|---|
| Material Description | % |
| Varnish Components | |
| Ethyl Alcohol | 5.3 |
| Diacetone Alcohol | 3.2 |
| Normal Propyl Acetate | 5.3 |
| Dipropylene Glycol Methyl Ether | 3.9 |
| Propylene Glycol Monomethyl Ether Acetate | 6.4 |
| Semi-Aliphatic Elastomeric Polyurethane resin Solution | 11.1 |
| Styrene Maleic Anhydride copolymer | 1.6 |
| Polyurethane Polyol resin solution | 4.2 |
| Titanium chelate adhesion promoter | 0.7 |
| Pigment Dispersion Components | |
| Propylene Glycol n-Propyl Ether | 18.0 |
| Propylene Glycol Monoethyl Ether | 10.4 |
| Nitrocellulose Resin | 5.0 |
| Copper Phthalocyanine Blue Pigment Color Index 15:4 | 13.3 |
| Normal Propyl Alcohol | 11.6 |
| Total | 100.0 |

The Non-Reactive Elastomeric Polyurethane resin, the Styrene Maleic Anhydride copolymer, the Polyurethane Polyol resin solution are the commercial products used in Example 1.

Example 7—Smear Resistant Magenta Ink

TABLE 9

| Example 7 | |
|---|---|
| Material Description | % |
| Varnish Components | |
| Ethyl Alcohol | 0.5 |
| Diacetone Alcohol | 2.2 |
| Normal Propyl Acetate | 6.0 |
| Dipropylene Glycol Methyl Ether | 2.7 |
| Propylene Glycol Monomethyl Ether Acetate | 4.4 |
| Semi-Aliphatic Elastomeric Polyurethane resin Solution | 7.7 |
| Styrene Maleic Anhydride copolymer | 1.1 |
| Polyurethane Polyol resin solution | 2.9 |
| Titanium chelate adhesion promoter | 0.5 |
| Pigment Dispersion Components | |
| Propylene Glycol n-Propyl Ether | 34.4 |
| Nitrocellulose Resin | 6.0 |
| Lithol Rubine Pigment Color Index 52 | 15.0 |
| Normal Propyl Alcohol | 16.5 |
| Total | 100.0 |

The Non-Reactive Elastomeric Polyurethane resin, the Styrene Maleic Anhydride copolymer, the Polyurethane Polyol resin solution are the commercial products used in Example 1.

Example 8—Smear Resistant Metallic Ink

TABLE 10

Example 8

| Material Description | % |
|---|---|
| Ethyl Alcohol | 16.2 |
| Normal Propyl Acetate | 7.3 |
| Semi-Aliphatic Elastomeric Polyurethane resin Solution | 26.0 |
| Titanium chelate adhesion promoter | 3.5 |
| Aluminum Pigment | 24.9 |
| Normal Propyl Alcohol | 22.1 |
| Total | 100.0 |

The Non-Reactive Elastomeric Polyurethane resin, the Styrene Maleic Anhydride copolymer, the Polyurethane Polyol resin solution are the commercial products used in Example 1.

Data Comparison

Inks were prepared by mixing the inventive varnish of Example 3 with a black pigment dispersion or a red pigment dispersion.

Comparison inks were prepared by mixing a commercially available varnish formulation with the same pigment dispersion mixed with the Example 3 varnishes in the same amounts. The data is described below.

In all instances, the applied adhesive is a 100% solids two component Polyurethane based (Isocyanate+Polyol) laminating adhesive applied at 1.0 lb/ream coat weight available under the trade name Purelam™ A5000/B9240 available from Ashland.

Inks were printed as barcodes on polyester film and laminated with Purelam™ A5000/B9240 adhesive to polyethylene sealant film. The printing method was via flexography on a commercial flexographic press, a Miraflex II made by W&H. Smearing was caused during the lamination process on a commercial NordMecanicca Laminator. The comparative ink was prepared by mixing a black pigment dispersion with a commmercially available varnish. The inventive ink was prepared by mixing the same black pigment dispersion with the Inventive Example 3 varnish. The commercially available varnish of the comparative ink includes a reactive polyurethane resin (that is, it contains reactive carboxyl functional groups). Further, the comparative ink does not contain a styrene maleic acid copolymer and it does not contain a polyurethane polyol resin.

The commercial ink exhibits substantial smearing while the inventive ink did not smear.

Inks were printed as barcodes on Polyester film and laminated with Purelam™ A5000/B9240 adhesive to polyethylene sealant film in the laboratory using laboratory printing machine (Flexiproof 100). The smear was caused by subjecting the laminated sample under a hydraulic press under 1 ton of pressure for 10 seconds at 49° C. The commercial ink exhibits substantial smearing while the inventive ink did not smear.

Inks were printed as text on Polyester film and and laminated with Purelam™ A5000/B9240 adhesive to polyethylene sealant film. The printing method was via Flexography on a commercial Flexographic press (Miraflex II made by W&H). Smearing was caused during the lamination process on a commercial NordMecanicca Laminator. The pigment dispersion includes a red pigment. The commercial ink exhibits substantial smearing while the inventive ink did not smear.

The inks were printed as solid lines on substrates. The comparative ink was prepared from a commercially available varnish that does not include the styrene maleic anhydride copolymer and the polyurethane polyol resin. Inks were printed on Polyester film and laminated with Purelam™ A5000/B9240 adhesive to polyethylene sealant film. The smear was caused by subjecting the laminated sample under a hydraulic press under 1 ton of pressure for 10 seconds at 49° C. The commercial ink exhibits substantial smearing while the inventive ink did not smear, Peel Strengths of Laminates Laminates were prepare by printing the ink compositions set forth in Table 11 below onto a polyester substrate, applying Purelam™ A5000/139240 adhesive over the ink, and then sealing with a polyethylene film layer.

The laminates were subjected to the Cook-In test, wherein a sealed pouch formed from the laminates and which contain polymer granules are placed in 90° C. water. The ink side of the pouches face outward towards the water.

After four (4) hours, the pouches are removed from the water and allowed to cool.

The laminates were subjected to peel strength testing in an Instron tester. Results are set forth in the Table 11.

TABLE 11

Peel Strength After Cook-In Process

| Laminate Structure | Black Ink | Maximum Load (gf/in) | Average Load (gf/in) |
|---|---|---|---|
| Polyester, Ink, Adhesive, Polyethylene | Inventive Example 5 + Pigment Dispersion | 444.5 | 162 |
| | Comparative Example (Ink of FIG. 2A) | 364 | 165 |
| | Comparative Example (Ink of FIG. 2A) | 192 | 75 |
| | Comparative Example (Ink of FIG. 5A) | 84 | 39 |
| | Comparative Example (Ink of FIG. 5A) | 64 | 36 |

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A smear resistant solvent-based ink comprising an elastomeric polyurethane resin, a styrene maleic anhydride copolymer, a polyurethane polyol resin, a pigment, and a group IV metal chelating agent adhesion promoter, wherein the ink provides smear resistance to polyol containing adhesives such as polyurethane adhesives.

2. The ink of claim 1, wherein the elastomeric polyurethane resin is a semi-aliphatic high molecular weight elastomeric polyurethane resin.

3. The ink of claim 1, wherein the elastomeric polyurethane resin is non-reactive.

4. The ink of claim 1, wherein the elastomeric polyurethane resin is tin-free.

5. The ink of claim 1, wherein the elastomeric polyurethane resin has a Tg of 60° C.

6. The ink of claim 1, wherein the elastomeric polyurethane resin is a tin-free semi-aliphatic high molecular weight elastomeric polyurethane.

7. The ink of claim 1, wherein the elastomeric polyurethane resin is a tin-free semi-aliphatic high molecular weight elastomeric polyurethane having a molecular weight of 90,000 to 120,000.

8. The ink of claim 1, wherein the pigment is present as a pigment component comprised of pigment and resin binder.

9. The ink of claim 1, wherein the resin binder is a polymer resin selected from nitrocellulose-based resins, polyester-based resins, polyurethane-based resins, polyvinyl butyral-based resins, styrene modified resins, and mixtures thereof.

10. The ink of claim 1, wherein the styrene maleic anhydride copolymer is a partial mono-ester of styrene maleic anhydride and a mixture of cyclohexanol and isopropyl alcohol, and has a molecular weight of 7000, a Tg of 125° C. and acid equivalent value of 270 mgKOH/g.

11. The ink of claim 1, wherein the polyurethane-polyol resin has a Tg of 100° C. to 160° C. and equivalent hydroxyl value of 170 mg KOH/g to 200 mg KOH/g.

12. The ink of claim 1, wherein the pigment dispersion includes an organic solvent selected from aliphatic alcohols and esters.

13. A printed article comprising a substrate printed with the ink composition of claim 1.

14. The printed article of claim 13, wherein the substrate is comprised of a material selected from polyester, polyethylene terephthalate, nylon, and polypropylene, such as biaxially oriented polypropylene.

15. The printed article of claim 13, further comprising an adhesive layer printed over the ink.

16. Flexible packaging comprising flexible packaging substrate printed with the ink of claim 1.

17. The flexible packaging of claim 16, wherein the flexible packaging substrate is comprised of a material selected from polyester, polyethylene terephthalate, nylon, and polypropylene, such as biaxially oriented polypropylene.

18. The flexible packaging of claim 16, further comprising an adhesive layer printed over the ink composition.

19. A method of improving smear resistance in a printed article comprising printing the ink composition of claim 1 onto a substrate.

20. The method of claim 19, wherein the ink resists smearing caused by an adhesive layer printed over the ink.

21. The method of claim 19, wherein the adhesive is a 100% solids polyurethane adhesive.

22. A smear resistant solvent-based varnish comprising an elastomeric polyurethane resin, a styrene maleic anhydride copolymer, a polyurethane polyol resin, and a group IV metal chelating agent adhesion promoter, wherein the varnish provides smear resistance to polyol containing adhesives such as polyurethane adhesives.

23. A smear resistant solvent-based metallic ink comprising an elastomeric polyurethane resin, a metallic pigment, a polyurethane polyol resin, and a group IV metal chelating agent adhesion promoter, wherein the ink provides smear resistance to polyol containing adhesives such as polyurethane adhesives.

* * * * *